(12) United States Patent
Huang

(10) Patent No.: US 6,461,028 B1
(45) Date of Patent: Oct. 8, 2002

(54) VEHICLE SIDE BUMPER AND SIGNAL LIGHT ASSEMBLY

(76) Inventor: Chin-Jeng Huang, P.O. Box 26-757, Taipei (TW), 106

( * ) Notice: Subject to any disclaimer, the term of this patent is extended or adjusted under 35 U.S.C. 154(b) by 0 days.

(21) Appl. No.: 09/883,535

(22) Filed: Jun. 15, 2001

(51) Int. Cl.[7] .............................. F21S 8/10; B60Q 1/32
(52) U.S. Cl. ...................... 362/505; 362/545; 362/549; 362/540
(58) Field of Search ................... 362/505, 545, 362/249, 520, 244, 339, 800, 540, 549

(56) References Cited

U.S. PATENT DOCUMENTS

| 4,996,634 | A | * | 2/1991 | Haneda et al. | 362/391 |
|---|---|---|---|---|---|
| 5,060,122 | A | * | 10/1991 | Miyoshi | 362/505 |
| 5,497,303 | A | * | 3/1996 | Decinti et al. | 362/505 |
| 5,895,115 | A | * | 4/1999 | Parker et al. | 362/496 |
| 6,149,288 | A | * | 11/2000 | Huang | 362/506 |
| 6,371,634 | B1 | * | 4/2002 | Tufte | 362/505 |
| 6,397,949 | B1 | * | 4/2002 | Pederson | 362/240 |

\* cited by examiner

*Primary Examiner*—Thomas M. Sember
(74) *Attorney, Agent, or Firm*—Rosenberg, Klein & Lee

(57) ABSTRACT

A vehicle side bumper and signal light assembly is constructed to include a hollow bumper having a longitudinal front slot, a signal light circuit board, and a transparent shell holding the signal light circuit board in the bumper. The shell has a lens with raised lens portions. Each raised lens portion has facets that reflect and refract the light of LEDs of the signal light circuit board toward the outside of the bumper through the longitudinal front slot.

8 Claims, 7 Drawing Sheets

VEHICLE SIDE BUMPER AND SIGNAL LIGHT ASSEMBLY

BACKGROUND OF THE INVENTION

The present invention relates to motor vehicle safety guards and, more specifically, to vehicle side bumper and signal light assembly which refract and reflect the light of a set of LEDs, preventing the light of the vehicle side bumper and signal light assembly from hurting the eyes.

The illumination of the headlights and taillights of a car running in the dark does not indicate the actual length of the car, and other people in front or behind the car cannot accurately estimate the actual distance of the car. A traffic accident may occur due to an error estimation of the distance of surrounding cars when driving a car at a high speed. In order to eliminate this problem, a vehicle side bumper and signal light assembly may be used. FIG. 1 shows a vehicle side bumper and signal light assembly according to the prior art, which comprises a hollow bumper 1a and a set of LEDs (light emitting diodes) 11a installed in the bumper 1a. The bumper 1a has a back sidewall 10a, a front sidewall 14a, a front slot 13a cut through the front sidewall 14a, and a LED mounting chamber 12a, which receives the LEDs 11a. Because the light of the LEDs 11a is directly viewed by nearby people, the light of the LEDs 11a may hurt the eyes of the other people.

SUMMARY OF THE INVENTION

The present invention has been accomplished to provide a vehicle side bumper and signal light assembly, which eliminates the aforesaid drawback. It is therefore the main object of the present invention to provide a vehicle side bumper and signal light assembly, which refracts and reflects the light of the signal lights thereof, preventing the light of the signal lights from hurting the eyes of the people. According to the present invention, the vehicle side bumper and signal light assembly comprises a hollow bumper having a longitudinal front slot, a signal light circuit board, and a transparent shell holding the signal light circuit board in the bumper. The shell has a lens with raised lens portions. Each raised lens portion has facets that reflect and refract the light of LEDs of the signal light circuit board toward the outside of the bumper through the longitudinal front slot. Therefore, the light of the vehicle side bumper and signal light assembly is gentle. and does not hurt the eyes of the people.

BRIEF DESCRIPTION OF THE DRAWINGS

FIG. 2A is an enlarged view of part A of FIG. 2.

DETAILED DESCRIPTION OF THE PREFERRED EMBODIMENT

Figure 1:
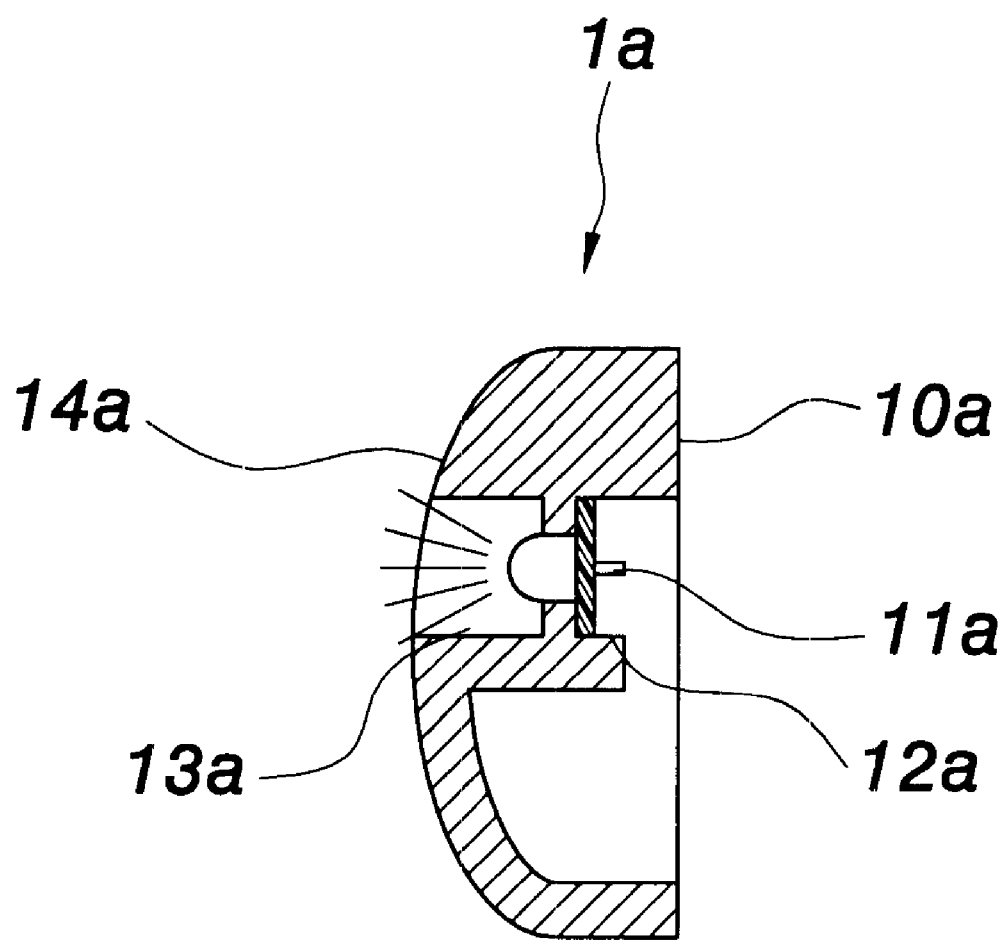
FIG. 1 is a cross-sectional view of a vehicle side bumper and signal light assembly constructed according to the prior art.
Figure 2:
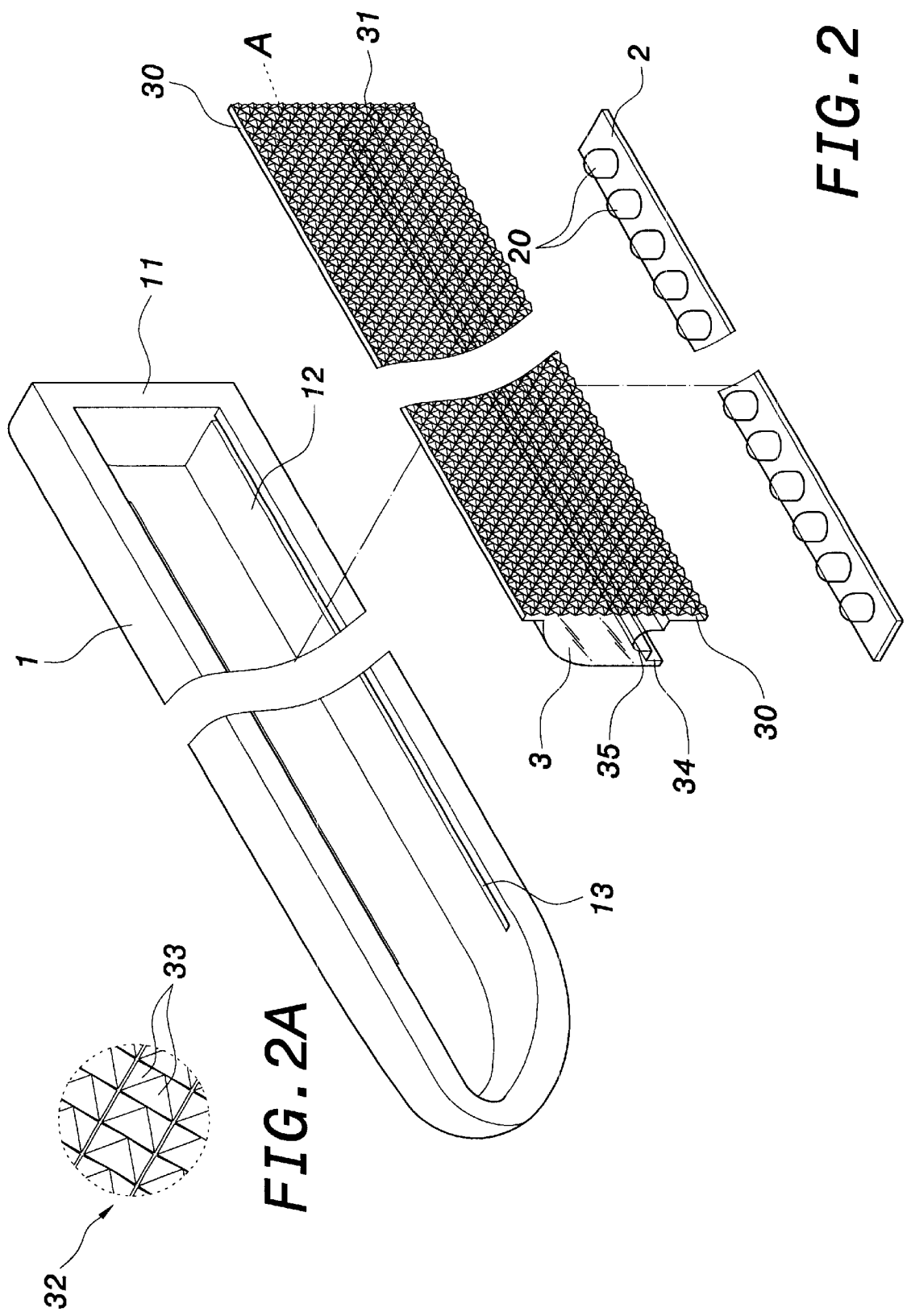
FIG. 2 is an exploded view of a vehicle side bumper and signal light assembly constructed according to the present invention.
Figure 3:
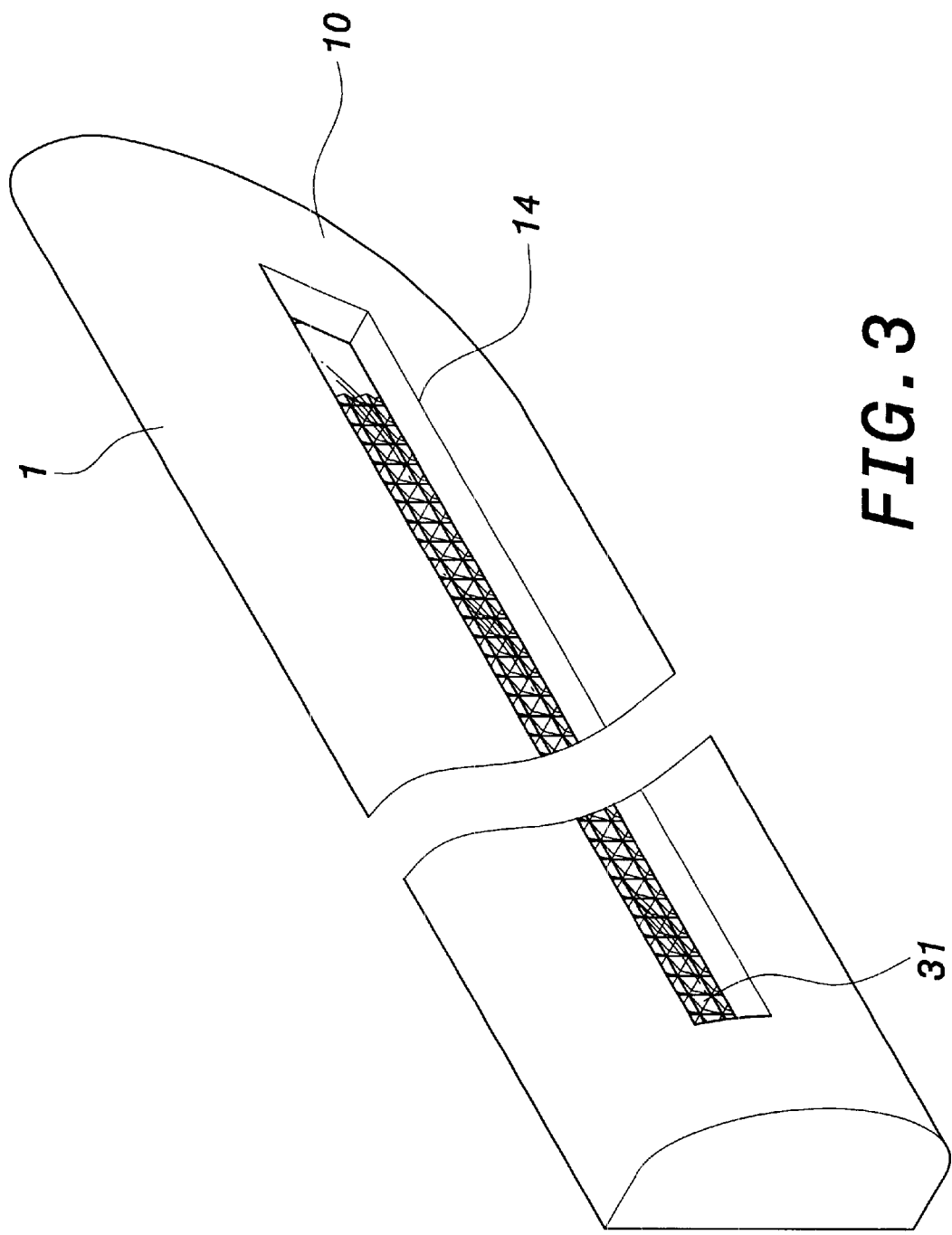
FIG. 3 is a front elevational view of the vehicle side bumper and signal light assembly according to the present invention.

Referring to FIGS. 2 and 3, a vehicle side bumper and signal light assembly in accordance with the present invention is generally comprised of a bumper 1, a signal light circuit board 2, and a transparent shell 3. The bumper 1 is a hollow, narrow, elongated member having a front sidewall 10, a back sidewall 11 for adhering to one side of the body of a motor vehicle, a back chamber 12 cut through the back sidewall 11, two longitudinal mounting grooves 13 disposed in parallel at two sides of the back chamber 12, and a longitudinal front slot 14 cut through the front sidewall 11 in communication with the back chamber 12. The front sidewall 10 has a smoothly arched cross section (see FIG. 3). The signal light circuit board 2 is an elongated circuit member mounted in the transparent shell 3, comprising a series of LEDs (light emitting diodes) 20 longitudinally arranged in a line. The transparent shell 3 is molded from transparent plastic material, for example, acrylic resin or polycarbonate, comprising two coupling flanges 30 respectively engaged into the longitudinal mounting grooves 13 of the bumper 1, a receiving chamber 35 adapted to receive the signal light circuit board 2, a positioning groove 34 adapted to hold the signal light circuit board 2 in the receiving chamber 35, and a lens 31 covering the longitudinal front slot 14 of the bumper 1. When in use, the light of the LEDs 20 pass through the lens 31 of the transparent shell 3 and the longitudinal front slot 14 of the bumper 1 to the outside of the bumper 1. The lens 31 is comprised of a plurality of raised lens portions 32, each raised lens portion 32 having a plurality of facets 33 (see FIG. 2A). The raised lens portions 32 preferably have the shape of a pyramid. When turning on the LEDs 20 of the signal light circuit board 2, the light of the LEDs 20 is reflected and refracted by the facets 33 of the raised lens portions 32 of the lens 31 to the outside of the bumper 1 through the front slot 14 of the bumper 1. Because the light of the LEDs 20 is not concentrated but refracted and reflected by the facets 33 of the raised lens portions 32 of the lens 31, the eyes of the people seeing the side bumper and signal light assembly will not be dazzled with the light of the LEDs 20.

Figure 4:
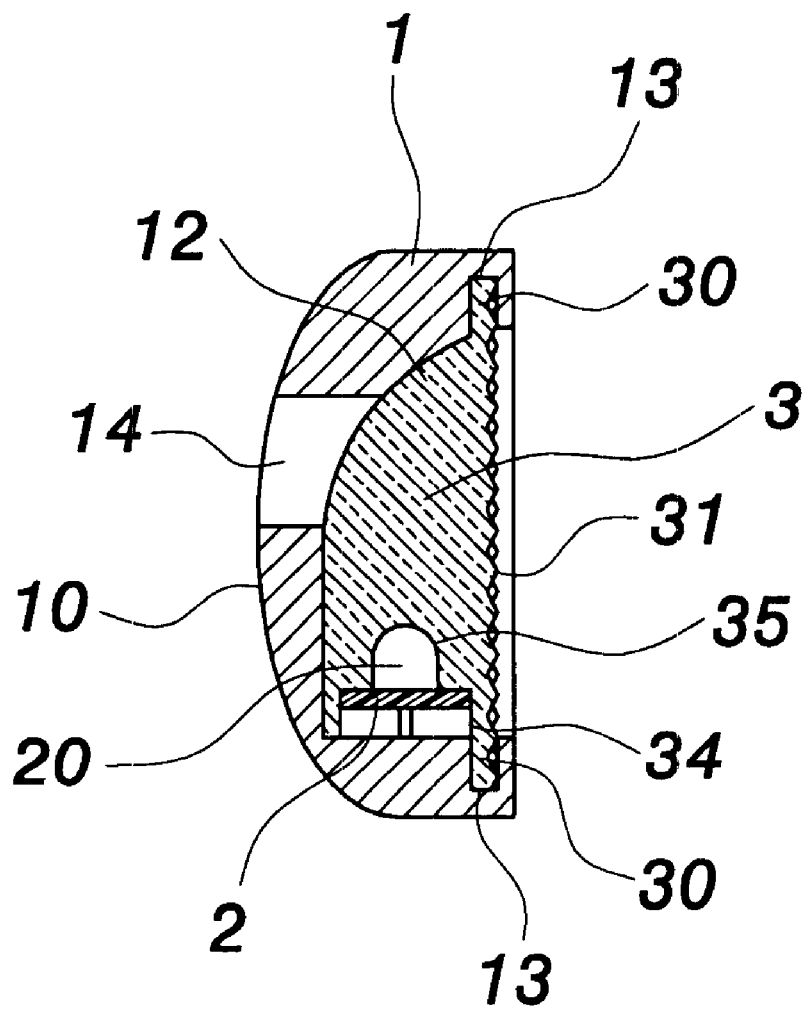
FIG. 4 is a cross-sectional view of the vehicle side bumper and signal light assembly according to the present invention.
Figure 5:
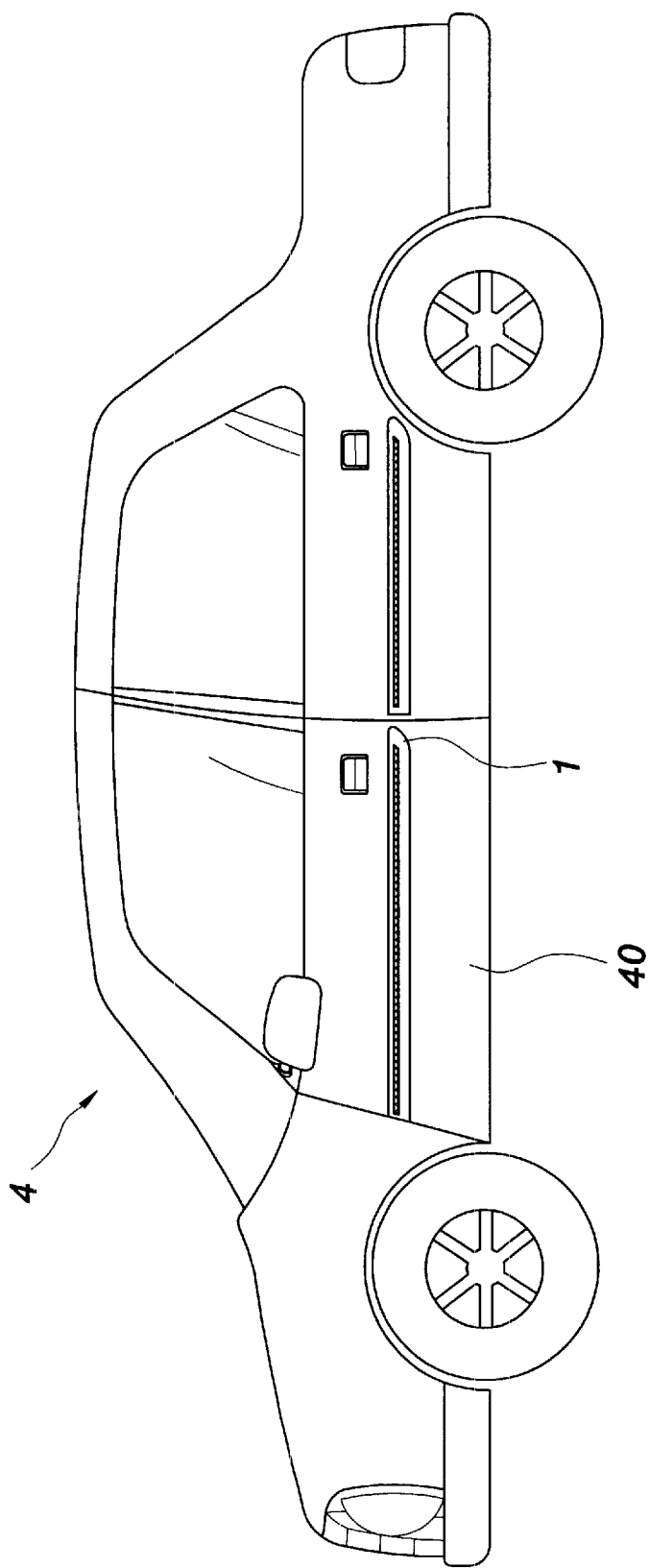
FIG. 5 shows the vehicle side bumper and signal light assembly installed in one side of a car according to the present invention.

Referring to FIGS. 4 and 5, the back sidewall 11 of the bumper 1 is bonded to one side 40 of the car 4 by an adhesive or a double-sided glue. When turning on the LEDs 20, the light of the LEDs 20 is reflected and refracted by the facets 33 of the raised lens portions 32 of the lens 31 to the outside of the bumper 1 through the front slot 14. Therefore, the light of the side bumper and signal light assembly is gentle and does not hurt the eyes.

Figure 6:
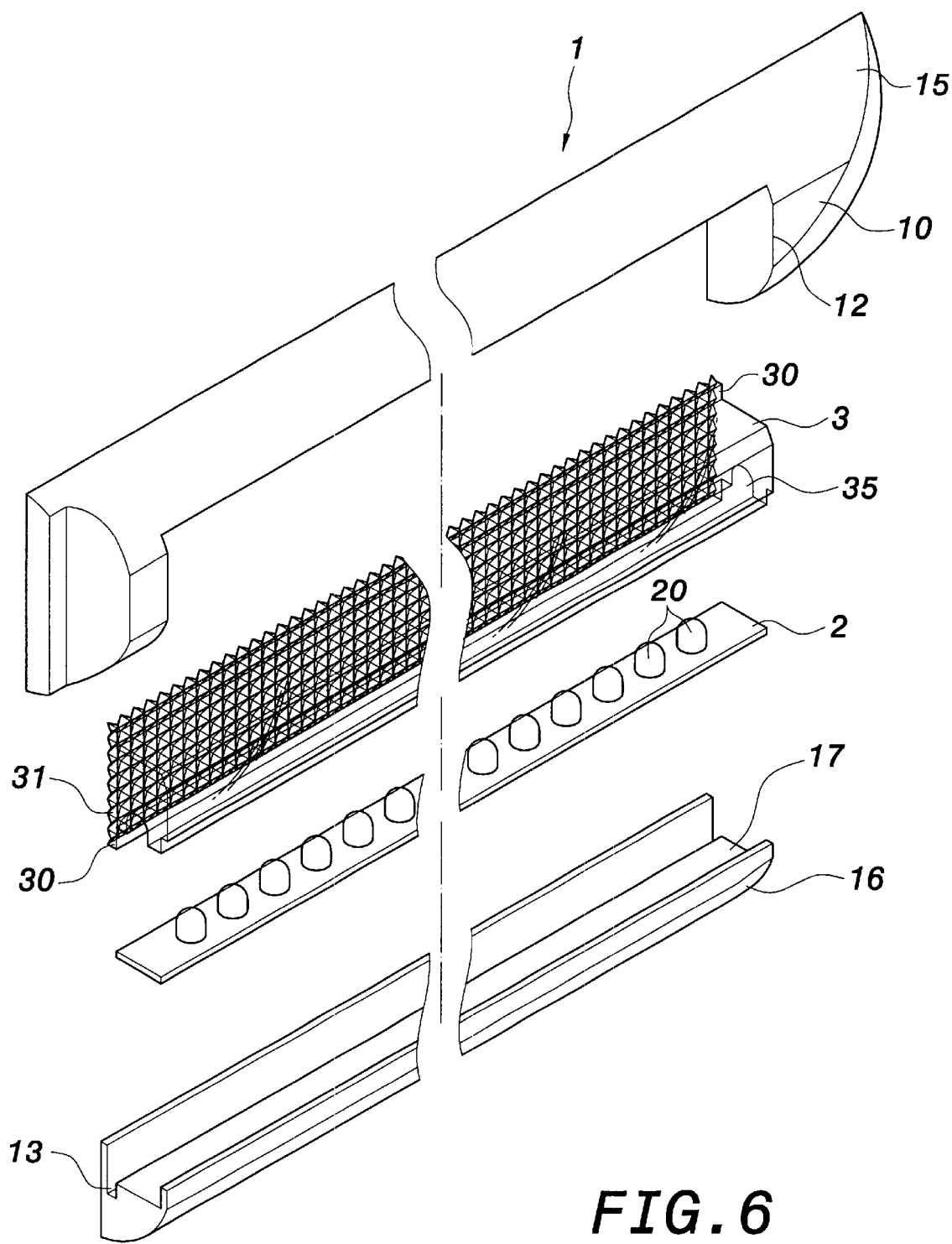
FIG. 6 is an exploded view of an alternate form of the present invention.
Figure 7:
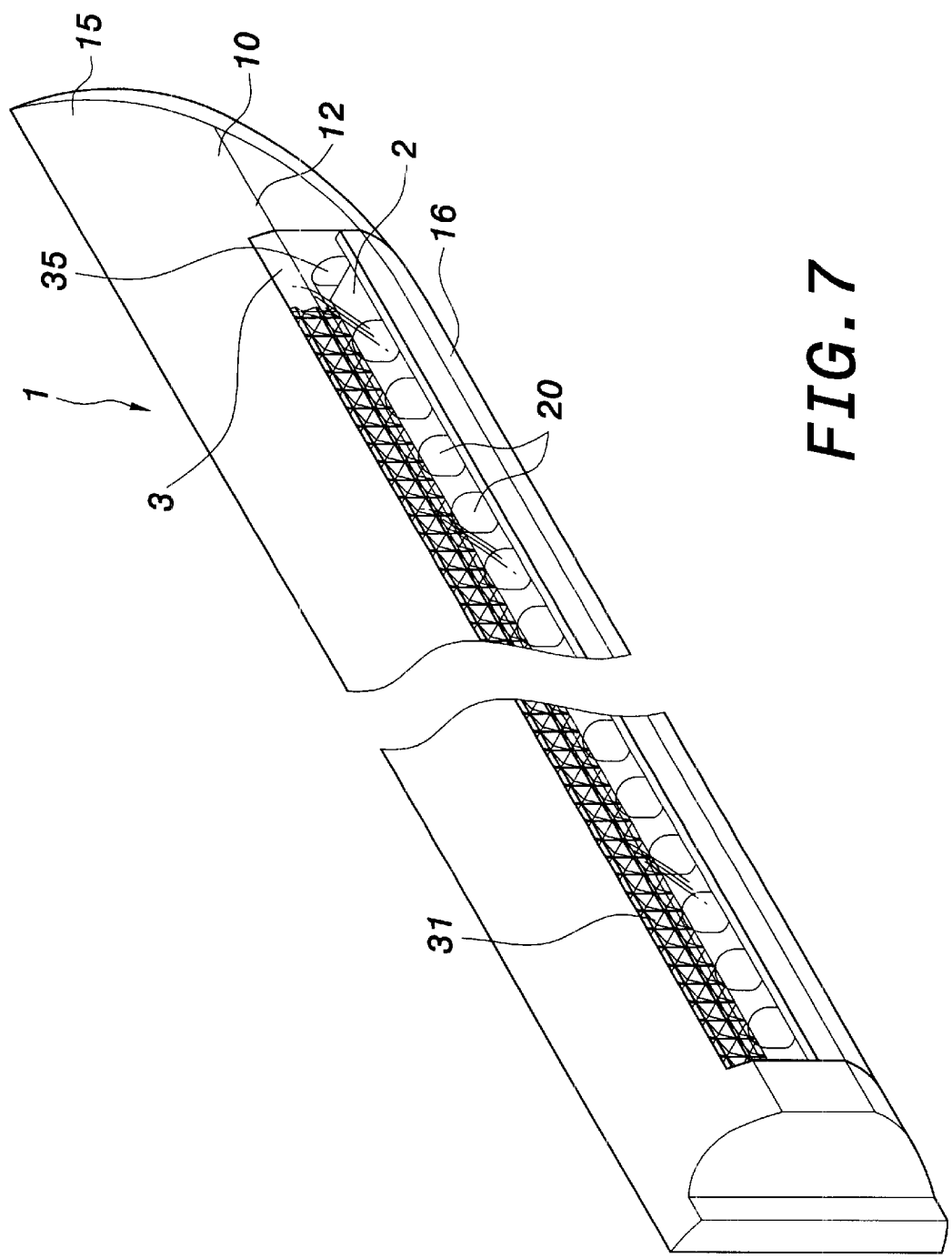
FIG. 7 is an elevational assembly view of the alternate form of FIG. 7.

FIGS. 6 and 7 show an alternate form of the present invention. According to this alternate form, the bumper 1 is comprised of a bumper base 15 and a cover plate 16 fastened to the bumper base 15 to hold the transparent shell 3 in the back chamber 12 of the bumper base 15 (the bumper base 15 and the cover plate 16 each have a respective longitudinal mounting groove 13 for the positioning of the transparent shell 3). The cover plate 16 has a longitudinal chamber 17, which receives the signal light circuit board 2.

A prototype of vehicle side bumper and signal light assembly has been constructed with the features of FIGS. 2~7. The vehicle side bumper and signal light assembly functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A vehicle side bumper and signal light assembly comprising:

a hollow, narrow, elongated bumper, said bumper having a front sidewall, a back sidewall fastened to one side of the body of a motor vehicle, a back chamber cut through said back sidewall, two longitudinal mounting grooves disposed in parallel at two sides of said back chamber, and a longitudinal front slot cut through said front sidewall in communication with said back chamber;

a signal light circuit board disposed inside said bumper, said signal light circuit board comprising a plurality of light emitting diodes; and a transparent shell mounted in said bumper, said transparent shell comprising two coupling flanges respectively engaged into the longitudinal mounting grooves of said bumper, a receiving chamber, which receives said signal light circuit board, and a lens covering the longitudinal front slot of said bumper, said lens being comprised of a plurality of raised lens portions, said raised lens portions each having a plurality of facets adapted to refract and reflect the light of said light emitting diodes.

2. The vehicle side bumper and signal light assembly of claim 1 wherein said bumper is comprised of a bumper base and a cover plate fastened to said bumper base to secure said transparent shell in position, said cover plate comprising a longitudinal chamber, which receives said signal light circuit board.

3. The vehicle side bumper and signal light assembly of claim 1 wherein said back sidewall of said bumper is fastened to one side of the body of said motor vehicle by glue.

4. The vehicle side bumper and signal light assembly of claim 1 wherein said light emitting diodes are longitudinally arranged in a line on said signal light circuit board.

5. The vehicle side bumper and signal light assembly of claim 1 wherein said transparent shell is molded from acrylic resin.

6. The vehicle side bumper and signal light assembly of claim 1 wherein said transparent shell is molded from polycarbonate.

7. The vehicle side bumper and signal light assembly of claim 1 wherein said transparent shell comprises a positioning groove, which holds said signal light circuit board in the receiving chamber of said transparent shell.

8. The vehicle side bumper and signal light assembly of claim 1 wherein said raised lens portions of said lens have the shape of a pyramid.

* * * * *